United States Patent [19]
Demma et al.

[11] Patent Number: 5,691,639
[45] Date of Patent: Nov. 25, 1997

[54] PROXIMITY SENSOR CIRCUIT WITH FREQUENCY CHANGING CAPABILITY

[75] Inventors: Nick A. Demma, Minneapolis; James E. Lenz, Brooklyn Park, both of Minn.; Dragutin Milosevic, Grosskrotzenburg, Germany; Joseph J. Simonelic, Rockford, Ill.

[73] Assignee: Honeywell Inc., Minneapolis, Minn.

[21] Appl. No.: 703,163

[22] Filed: Aug. 28, 1996

[51] Int. Cl.$^6$ .................................................. G01B 7/14
[52] U.S. Cl. ........................ 324/207.26; 324/232
[58] Field of Search .................. 324/207.26, 207.16, 324/232, 207.12, 207.11, 234, 236

[56] References Cited

U.S. PATENT DOCUMENTS 5,180,978   1/1993   Postma et al. .

*Primary Examiner*—Walter E. Snow
*Attorney, Agent, or Firm*—William D. Lanyi; John G. Shudy, Jr.

[57] ABSTRACT

A proximity sensing circuit is provided with various attributes, including the connection of a proximity sensor coil in a feedback loop of an amplifier, the frequency hopping technique that periodically changes the two frequencies used by its proximity sensor circuit to avoid deleterious interference by constant frequency EMI sources and the provision of a self diagnosis technique. The connection of the proximity sensor coil in the feedback loop of an amplifier results in several advantages including the connection of the coil to a virtually infinite impedance, the reduction of the number of components needed in the proximity sensing circuit and decreased temperature sensitivity of the overall circuit. The frequency hopping technique that periodically changes the two frequencies used by the proximity sensor significantly decreases the likelihood that a constant frequency EMI source in the vicinity of the circuit will have a continually adverse affect on its accuracy and reliability. In applications that require a large number of sensors, the circuit uses a multiplexer with a plurality of sensors and a single filtering network to decrease the necessary number of components in the proximity sensing circuit. Self diagnosis can be performed by using precision resistors or by intelligently monitoring the changing values of the AC impedance, the DC resistance and the compensated resistance, either individually or in combination with each other, to predict certain potential malfunctions.

18 Claims, 9 Drawing Sheets

|  | Low | $R_{AC}$ Normal | High |
|---|---|---|---|
| Low | • Sensor fault (short circuit) | • Circuit fault | • Circuit fault |
| $R_{DC}$ Normal | • Rigging faults<br>—Rigging slack<br>—Sensor crosstalk<br>—Target misaligned | • Normal operation | • Rigging fault<br>—Stray magnetic rigging material |
| High | • Sensor fault Open Circuit | • Line fault Open Circuit | • Circuit fault |

Fig. 9

PROXIMITY SENSOR CIRCUIT WITH FREQUENCY CHANGING CAPABILITY

FIELD OF THE INVENTION

The present invention is generally related to a system incorporating one or more sensors and, more specifically, a proximity sensing circuit that arranges a proximity detector in the circuit within the feedback loop of an amplifier, enables periodic changes in the frequencies used during the detection process and provides a system with which a large number of proximity detectors can be monitored by a microcontroller with a minimum number of circuit components required.

DESCRIPTION OF THE PRIOR ART

Many different types of proximity sensors are well known to those skilled in the art. One specific type of improved proximity sensor is described in U.S. Pat. No. 5,180,978, which issued to Postma et al on Jan. 19, 1993. It discloses a proximity sensor with a reduced temperature sensitivity. The proximity sensor is provided with a means for directly measuring parameters of a proximity sensor coil which permit the determination of both AC and DC resistances of the coil. These parameters are then used to determine a discriminator value magnitude according to a mathematical relationship that has been predetermined through previous analysis of empirical data for the particular coil and application intended for the proximity sensor. In one particular application of the sensor, the real AC resistance is utilized and is added to the DC resistance after the DC resistance has been mathematically altered by a preselected factor. Alternative embodiments of the sensor can also utilize the imaginary AC component of the impedance either by itself or in conjunction with the real AC component of the impedance. Whether the real or imaginary AC components of the impedance are used individually or together, the DC resistance is used in the determination of the discriminator value magnitude because of its reliable relationship to the temperature of the coil. U.S. Pat. No. 5,180,978 is hereby explicitly incorporated by reference herein.

In certain applications of proximity sensors, such as in a commercial airliner, dozens or even hundreds of proximity sensors may be required. Since each proximity sensor typically requires a large number of associated circuit components, the number of parts needed to satisfy the requirements of large applications can be very large. It would therefore be significantly beneficial if the total number of components in an application with numerous proximity sensors could be reduced.

Another problem that can adversely affect an application comprising a plurality of proximity sensors is that electrical noise or electromagnetic interference (EMI) can adversely affect the operation of the proximity sensors. Certain types of sensors incorporate signals of one or more fixed frequencies. If another apparatus causes the generation of EMI of a similar frequency, it may adversely interfere with the operation of the proximity sensor. It would therefore be significantly beneficial if a proximity sensor circuit could be developed which effectively decreases the Sensitivity of the circuit to the EMI generating apparatus. EMI can be caused by external hostile apparatus, radio, television, radar, lightning, power supplies, the combined heat frequencies of generators, noise from cables or conductors and other sources.

Another problem that can occur in proximity sensing systems is the degradation or failure of some of the components used in the system as a result of internal or external causes. As a result of component degradation, the operation of a proximity sensing circuit can become unacceptable, either slowly or as a result of a sudden change of condition. It would be beneficial if a proximity sensing circuit could perform a self diagnosis to determine whether or not its components are working together properly.

Various embodiments and adaptations of the present invention can be utilized to address each of the problems described above.

SUMMARY OF THE INVENTION

The following description will disclose and illustrate several different advantageous characteristics that are applicable with proximity sensing circuits.

One version of the proximity sensing circuit comprises a plurality of sensors and a multiplexer, wherein each of the plurality of sensors is connected in signal communication with the multiplexer. A filter is connected in signal communication with the multiplexer, the multiplexer being connected between the plurality of sensors and the filter. A controller, which can be a microcontroller, is connected in signal communication with the filter and a means is provided for comparing filtered signals from each of the plurality of sensors to a first predetermined threshold magnitude. The comparison of the filtered signals to the first predetermined threshold magnitude allows the controller to determine whether or not a metallic object is within the detection zone of each of the proximity sensors. One or more precision resistors can also be connected in signal communication with the multiplexer. A means can be provided for comparing a signal from each of the resistors to a second predetermined threshold magnitude. The precision resistor allows the system to diagnose the operation of the circuit as a function of the signal from the resistor. If, for example, the resistance of the precision resistor is measured to be different than the known resistance of the precision resistor, the system can diagnose itself as having some type of malfunction. Alternatively, the system can take corrective actions to make corrections in the measured filtered signals from the proximity sensors as a function of the perceived error in the measurement of the resistance of the precision resistor.

Another version of the proximity sensing circuit comprises a proximity detector having a coil in which the coil has a first end and a second end. The coil is connected to an amplifier having a first input, a second input and an output. The coil is connected between the first input and the output of the amplifier and serves as part of the feedback loop of the amplifier. A first source of a first waveform having a first frequency is provided along with a second source of a second waveform having a second frequency. The circuit further comprises a means for combining the first and second waveforms to provide a combined waveform. The combining means is connected to the first input of the amplifier. A filter is connected to the output of the amplifier in order to provide a first output signal. An inverter is connected to the filter to provide a second output signal. The proximity sensing circuit further comprises a means, connected in signal communication with the coil, for determining a distance between a metal object and the coil as a function of the first and second output signals. The first output signal can represent an AC resistance of the coil and the second output signal can represent a DC resistance of the coil. The first input of the amplifier can be its inverting input and the second input of the amplifier can be connected to a circuit point of ground potential. The second input of the amplifier can be a noninverting input. The filter is connected between the inverter and the output of the amplifier.

Another version of the proximity sensing circuit comprises a proximity detector such as that described immediately above which is connected in association with an amplifier, first and second sources of waveforms, a combining means to provide a combined waveform, a filter, an inverter, and a distance determining means. In addition, this version of the proximity sensing circuit further comprises a first means for creating a first series of pulses and a second means for creating a second series of pulses. The first and second creating means have output connected to the inputs of the first and second sources of the first and second waveforms, respectively. The present invention further comprises a first means for periodically changing the frequency of the first series of pulses and a second means for periodically changing the frequency of the second series of pulses. The first and second creating means can be a controller and the first and second periodically changing means can comprise a controller. The first source comprises a digital-to-analog converter and the second source comprises a digital-to-analog converter. The frequency of the first series of pulses can be higher than the frequency of the second series of pulses. The advantage of this version of the present invention is that the periodic changing of frequencies significantly reduces the probability that an interfering apparatus will closely match the frequency used by the proximity sensing circuit for a significant period of time and therefore deleteriously affect its operation. The device can also dynamically control the filter bandwidth to improve initialization speed and reduce noise capture.

BRIEF DESCRIPTION OF THE DRAWINGS

The present invention will be more fully and completely understood from a reading of the Description of the Preferred Embodiment in conjunction with the drawings, in which:

FIG. 9 is a matrix used by the present invention to diagnosis certain potential faults in the proximity sensing circuit.

DESCRIPTION OF THE PREFERRED EMBODIMENT

Figure 1:
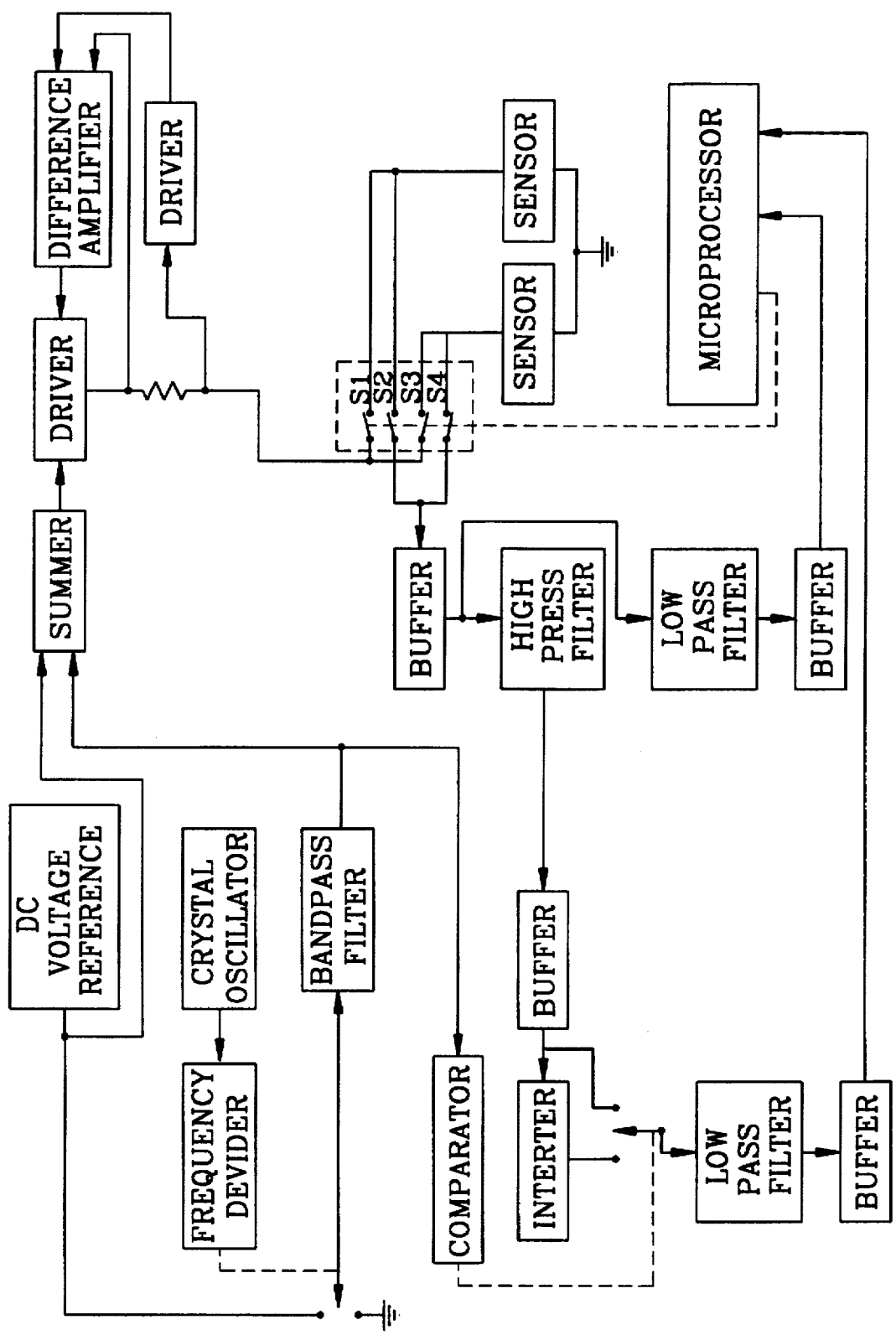
FIGS. 1 and 2 are reproductions of two Figures from U.S. Pat. No. 5,180,978.

Throughout the Description of the Preferred Embodiment, like components will be identified by like reference numerals.

Figure 4:
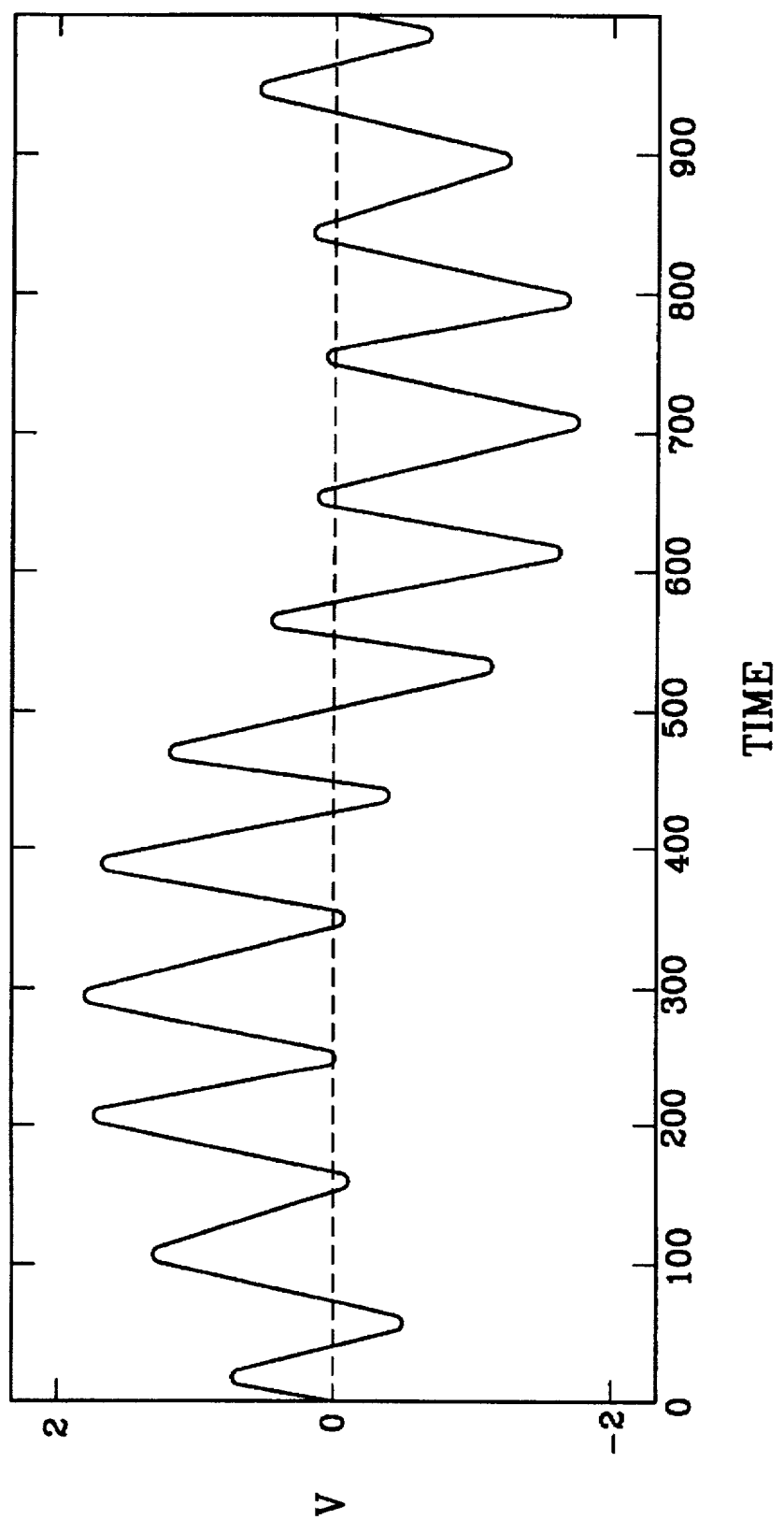
FIG. 4 illustrates the combined waveform resulting from two waveforms of different frequencies.

FIG. 1 is a reproduction of FIG. 4 from U.S. Pat. No. 5,180,978. That Figure, which is reproduced without its original reference numerals and letters, is a functional block diagram of a circuit that can perform the necessary functions of determining the AC impedance and DC resistance necessary to perform the calculations which allow the determination of the distance between a metallic object and the coil of the sensor. As described in greater detail in U.S. Pat. No. 5,180,978, a DC voltage reference source provides a predetermined DC voltage to a summer and to a switch. A crystal oscillator provides a high frequency AC signal to a frequency divider which has an output that is used to control the switch. The frequency output from the crystal oscillator is a fixed frequency and, in the preferred embodiment of U.S. Pat. No. 5,180,978, is 1.8432 MHZ. The output from the frequency divider is 980 Hertz after being divided by 2048 by the divider. The output from the frequency divider provides a series of squarewave pulses which have an accurately preselected voltage magnitude. The band pass filter converts the squarewave input to a sinusoidal output.

Figure 2:
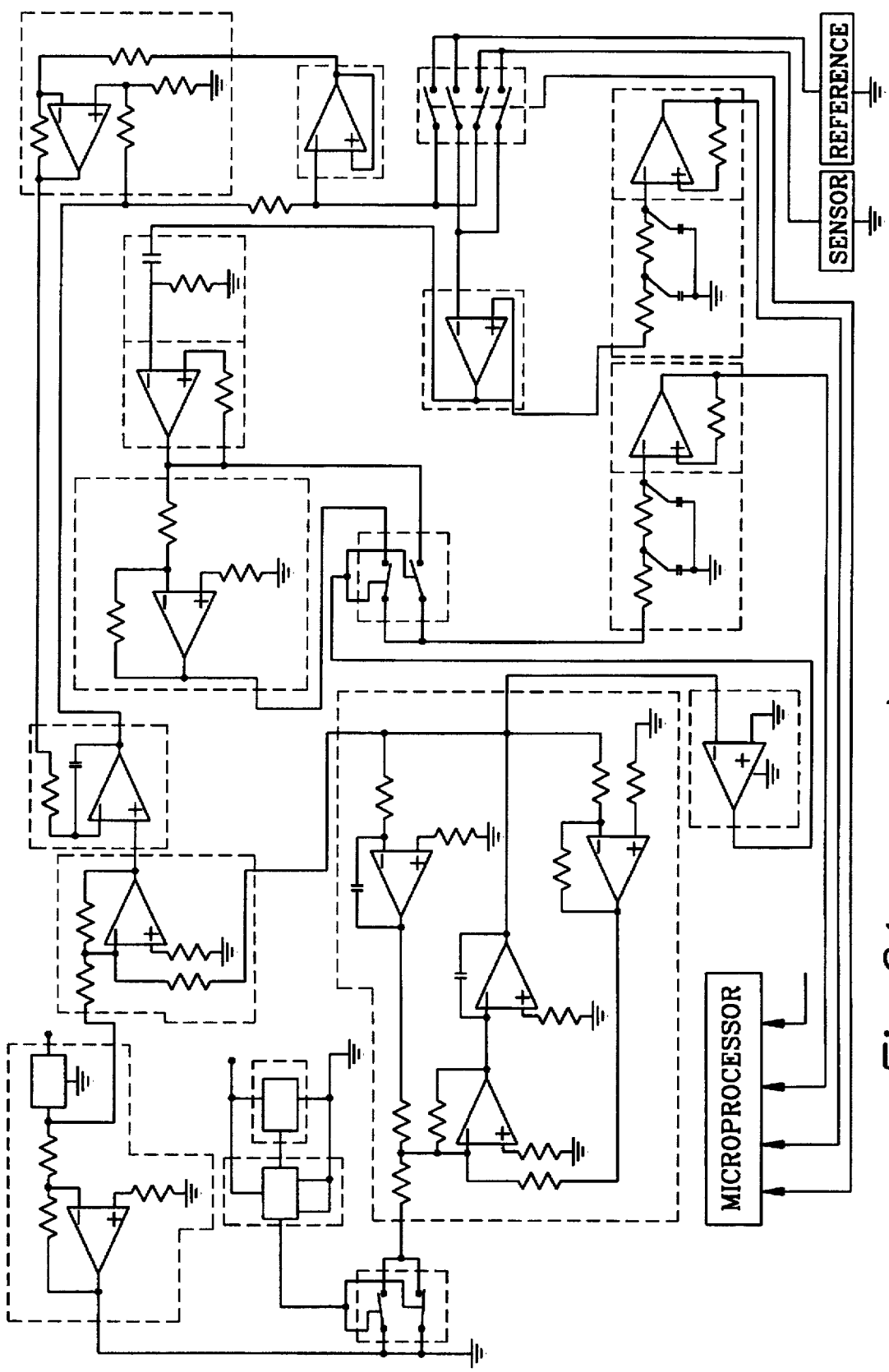
Figure 8:
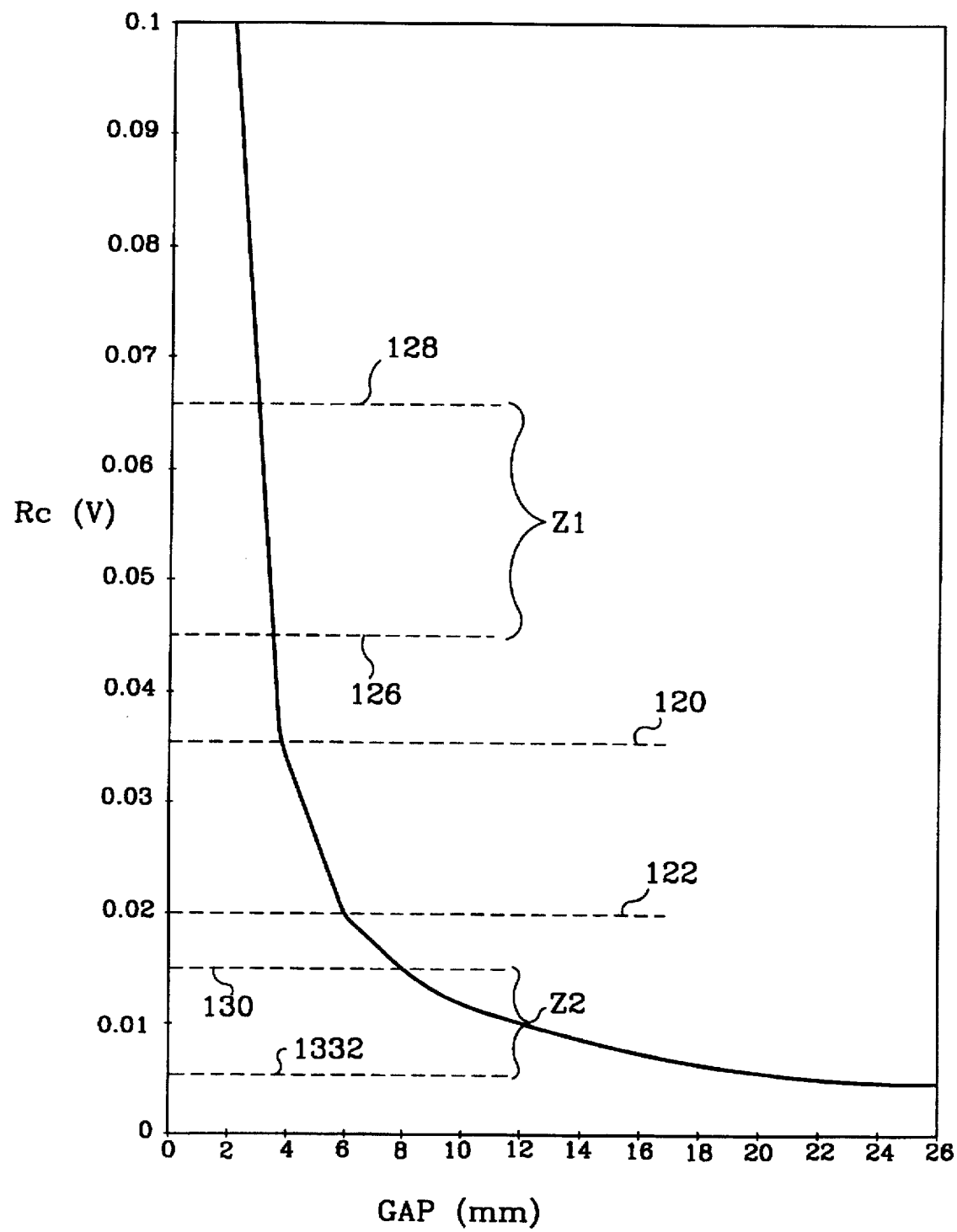
FIG. 8 shows a relationship between calculated value of compensated resistance of the actual gap between a metallic object and the coil of a proximity sensor.

FIG. 2 is a reproduction of FIG. 8 from U.S. Pat. No. 5,180,978. FIG. 2 shows the circuit without its original reference numerals and letters. The circuit shown in FIG. 2 illustrates a detailed schematic of the circuit shown in FIG. 1. The dashed boxes in FIG. 2 represent the boxes in FIG. 1. With reference to FIGS. 1 and 2, which are reproductions of FIGS. 4 and 8 from U.S. Pat. No. 5,180,978, it can be seen that a large plurality of components are necessary to measure the AC and DC variables and determine the presence or absence of a metallic object within a detection zone near the coil of the sensor. These Figures are reproduced in order to illustrate the complexity of the circuit and relatively large number of components required to perform these functions. If a plurality of sensors is used in a single application, such as a commercial airliner, the number of components necessary to perform the total monitoring function could be significantly large. As a result, several disadvantageous results can occur. A large number of components increases the weight of the system and the likelihood of a component failure. In addition, each of the components will exhibit its own temperature sensitive characteristics. When a large number of components are used in a circuit or system, the wide variation of temperature responsive characteristics can significantly complicate the task of calibrating the system and maintaining its accuracy over a large temperature range which is typically not the same for both the remote sensors and the associated circuitry. It would therefore be beneficial if the number of components in a system of proximity sensors and related circuitry could be reduced.

The various adaptations and versions of the present invention will be described below without a specific detailed recitation of the precise ways in which the AC resistance and DC resistance are measured and combined together to form the information necessary to determine the distance between the metallic object and the coil. These techniques, including detailed formulae, are described in U.S. Pat. No. 5,180,978 which is explicitly incorporated herein by reference.

Figure 3:
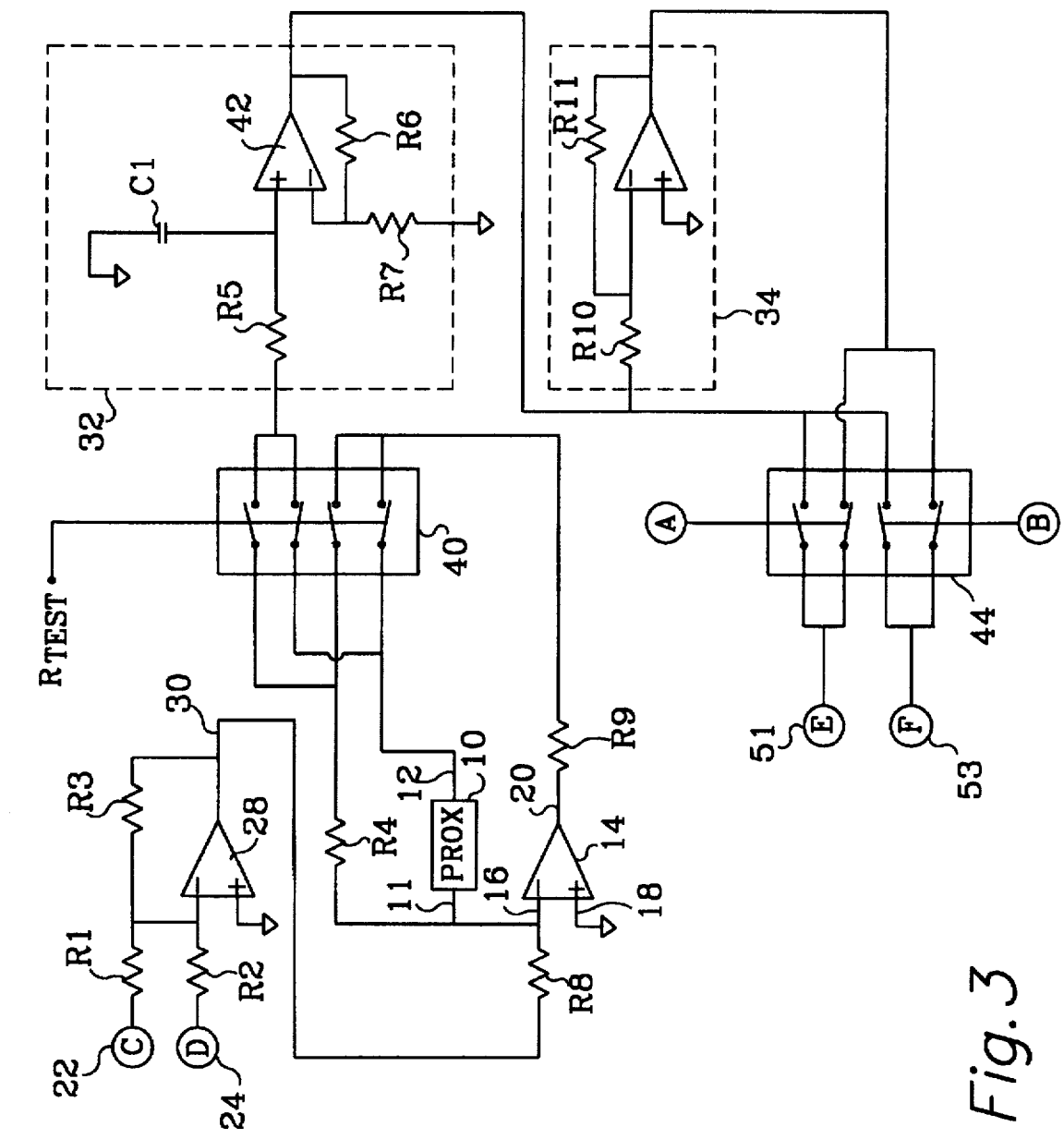
FIG. 3 is a circuit portion that shows the connection of a proximity sensor in the feedback loop of an amplifier.

FIG. 3 shows a portion of a proximity sensor circuit made in accordance with the concepts of the present invention. It comprises a proximity detector 10, or proximity sensor, which has a coil within it. The coil of the proximity detector 10 is not shown in FIG. 3, but those skilled in the art are familiar with the internal structure of many different types of proximity detectors. The coil is provided with a first end and a second end. Conductors connected to the first and second ends are identified by reference numerals 11 and 12, respectively. The proximity sensing circuit further comprises an amplifier 14 that has a first input 16, a second input 18 and an output 20. The coil of the proximity detector 10 is connected between the first input 16 and the output 20 of the amplifier 14. The circuit further comprises a first source 22 of a first waveform having a first frequency. It also comprises a second source 24 of a second waveform having a second frequency. The first and second waveforms are generally sinusoidal in shape. The circuit comprises an amplifier 28 which serves as a means for combining the first and second waveforms to provide a combined waveform, on line 30, which is connected to the first input 16 of the amplifier 14. The circuit in FIG. 3 further comprises a filter 32 and an inverter 34. The functions of the filter and inverter are generally well known to those skilled in the art and are explained in detail in U.S. Pat. No. 5,180,978.

FIG. 3 also shows two sets of switches. The set of switches identified by reference numeral 40 is used to select the resistor R4 in place of proximity sensor 10 and connect it to both the noninverting input of amplifier 42 and the output 20 of amplifier 14. This allows the system to be tested to assure that the various components are operating properly. The other set of switches, which is identified by reference numeral 44, allows the two outputs, identified by reference numerals 51 and 53 in FIG. 3, to be selectively connected to the outputs of the filter 32 or inverter 34 sequentially. The control of switch 44 will be described in greater detail below.

In FIG. 3, it can be seen that the proximity sensor 10 is connected as part of the feedback loop of amplifier 14. As such, the proximity sensor is connected to a current pump which makes recovery of synchronously demodulated signals easier. This arrangement also reduces the sensor's sensitivity to stray capacitance. Fewer components therefore improve the system's accuracy and reliability. Comparing the circuit of FIG. 3 with the two prior art circuits illustrated in FIGS. 1 and 2, it can be seen that the prior art connects the sensor directly to a circuit point of ground potential and does not utilize the sensor as part of an amplifier's feedback loop. This is an important distinction between the present invention shown in FIG. 3 and the prior art which is illustrated in FIGS. 1 and 2 and discussed in U.S. Pat. No. 5,180,978. The circuit shown in FIG. 3 requires fewer components than the prior art and this, in turn, results in several advantages. The circuit has better temperature sensitivity because of the reduced number of components and the resulting reduced number of different temperature sensitivities of those components. In addition, the variability of the characteristics of components can be much greater in a circuit that utilizes a large number of components than in one, such as the present invention, which significantly reduces the number of components.

The output terminals, 51 and 53, shown in FIG. 3 represent the terminals at which signals representing the AC impedance and DC resistance are provided. At terminal 51, the AC impedance is made available to other sections of the circuit and, at terminal 53, the DC resistance is made available to other portions of the circuit.

The two waveforms, provided by the first source 22 and second source 24, are combined together by amplifier 28 to impose the higher frequency waveform on the lower frequency waveform. Although many different frequencies can be used to accomplish this procedure, FIG. 4 shows a hypothetical representation of a first waveform imposed on a second waveform. The horizontal axis in FIG. 4 represents arbitrary time units and the vertical axis in FIG. 4 represents signal amplitude. The lower frequency waveform represented in FIG. 4 can be seen to exhibit approximately one cycle of its wavelength in the representation shown. The higher frequency, on the other hand, is illustrated as being approximately 11 times the lower frequency. The mathematical relationship between the two frequencies and the absolute magnitudes of the two frequencies are not limiting in any way to the present invention.

In a proximity sensing circuit which utilizes two frequencies in the manner described above, the accuracy and integrity of the circuit can be adversely affected by an apparatus in the vicinity which generates EMI at an identical or similar frequency. For example, in a proximity sensing circuit with a first waveform at a frequency of 1700 Hertz and a second waveform at a frequency of 13 Hertz, nearby equipment generating EMI at approximately 1700 Hertz could seriously jeopardize the accuracy and acceptable performance of the circuit. The EMI, which could be additive or subtractive to the first or second waveforms, would seriously jeopardize the operation of the sensing circuit.

Figure 5:
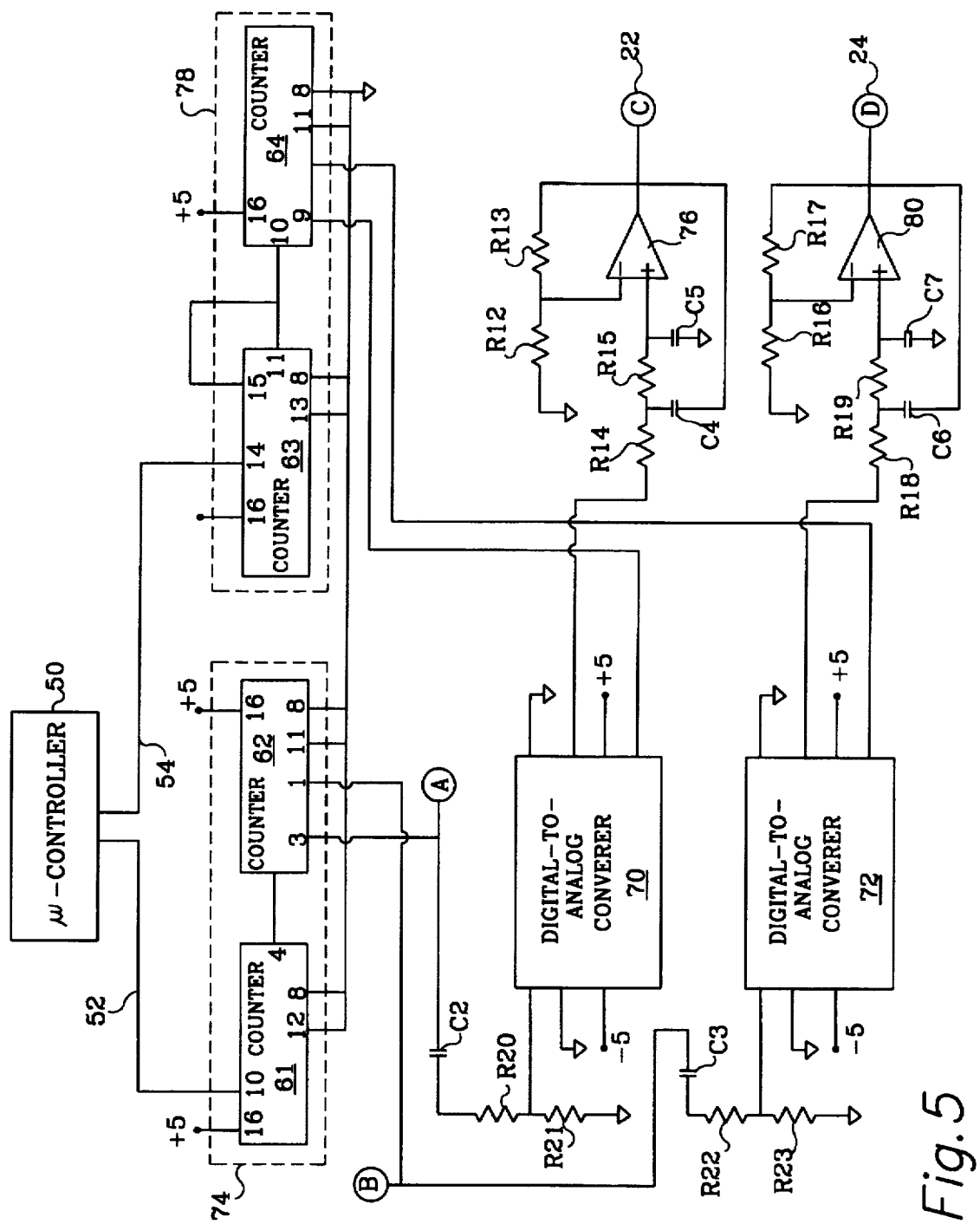
FIG. 5 shows a circuit portion that enables the proximity sensing circuit to periodically change both of its frequencies as a technique for avoiding potential EMI interference.

In order to reduce the likelihood that nearby EMI-emitting equipment will deleteriously affect the operation of the proximity sensing circuit, the present invention provides a circuit portion, illustrated in FIG. 5, which significantly decreases the probability of these adverse effects. The circuit in FIG. 5 operates as a waveform generator for both the first and second waveforms described above. A microcontroller 50 creates a first series of pulses on line 52 and a second series of pulses on line 54. The pulses created by the microcontroller 50 are typically squarewave pulses. The series of pulses on lines 52 and 54 can exhibit similar frequencies or different frequencies, depending on the specific application to which the present invention is employed. Line 52 from the microcontroller 50 is associated with counters 61 and 62. Line 54 from microcontroller 50 is associated with counters 63 and 64. Counters 61 and 62 are generally associated with the higher frequency signal identified herein as the first waveform at the source 22. Counters 63 and 64 are related to the generation of the lower frequency waveform identified as the second waveform from the second source 24. Digital-to-analog converter 70 is used to convert the squarewave input from the first counter system 74 to a sinusoidal waveform that is provided as an input to amplifier 76 and the first source 22. The second counter system 78 is associated with digital-to-analog converter 72 which provides a signal to amplifier 80 and provides the waveform at the second source 24.

With continued reference to FIG. 5, those skilled in the art are familiar with the use of counters, digital-to-analog converters and amplifiers to provide signals of varying inputs and outputs. Furthermore, one skilled in the art will recognize that circuit in FIG. 5 will provide a first waveform at the first source 22 which has a frequency that is a function of the frequency provided by the microcontroller 50 on line 52. Furthermore, the second waveform at the second source 24 will have a frequency that is a function of the frequency provided by the microcontroller 50 on line 54. The microcontroller 50 can easily be programmed to periodically change the frequencies of the series of pulses provided on lines 52 and 54. By periodically changing these frequencies, the likelihood that an EMI-generating device, either nearby or at a distance, will adversely interfere with the operation of the proximity sensing circuit is significantly reduced. This reduction of the probability of interference from a constant frequency EMI source enhances the operation of the proximity sensing circuit and avoids what would otherwise be a debilitating effect on the circuit which is located near a piece of equipment that generates an EMI signal either nearby to either one of the two frequencies provided at the first and second sources, 22 and 24, or from a distance. This frequency hopping technique reduces the likelihood that the EMI frequency will match either of the two frequencies at the first and second sources, 22 and 24, for any appreciable duration of time.

It should be understood that the microcontroller 50 illustrated in FIG. 5 could alternatively provide a single output line instead of the two lines shown. The single output line could be connected to two counter systems such as those identified by reference numeral 74 and 78. The eventual frequencies provided to the digital-to-analog converters, 70 and 72, could alternatively be achieved through the use of the counters instead of providing the counting systems with two inputs of different frequencies as described above. The specific means of dividing the frequencies is not critical to the operation of the present invention. Instead, the primary advantage of the present invention described in conjunction with FIG. 5 is its ability to periodically change the two frequencies in order to decrease the likelihood of either of the two frequencies at the first and second source, 22 and 24, being similar to an EMI frequency in the nearby vicinity. This frequency hopping technique reduces the likelihood of this type of EMI interference adversely affecting the proper operation of the proximity sensing circuit.

Figure 6:
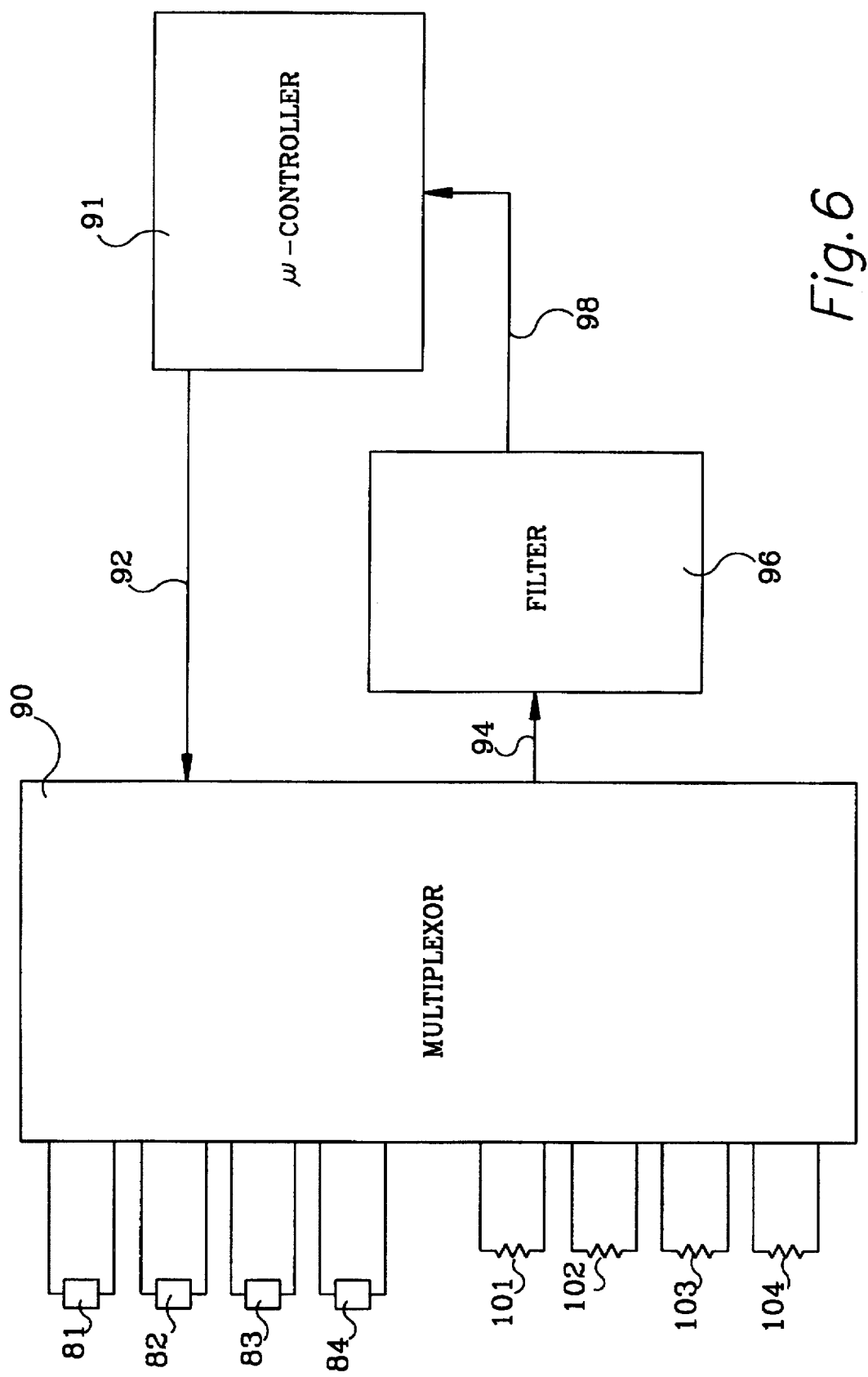
FIG. 6 is a highly schematic representation of a circuit configuration in which a multiplexer is connected between a filter and a plurality of sensors.

In any system of sensors which requires the use of large numbers of individual sensors, the reduction and minimization of parts count becomes critical. Not only is a large number of individual components disadvantageous because of its increase of the system's costs, but the large number of components also adversely affects the reliability of the system and its mean time between failures. In order to reduce the number of components in a system, those skilled in the art of circuit design are familiar with the use of multiplexers which permits a single device, such as a microprocessor or microcontroller, to receive signals from a plurality of components, such as sensors. However, with sensors that require the use of filtering components, systems known in the prior art typically connect the filtering components to the sensors and then these components filter the signals prior to passing the signals through a multiplexer. When this technique is implemented, a different filter network is required for each sensor. The present invention connects the multiplexer between a single filter network and the plurality of sensors. In this way, the same filter network can be used to filter the signals from each of the individual sensors after the unfiltered signals are passed through the multiplexer. After filtering, the signals are provided through an analog to digital converter to a microcontroller for analysis. This configuration is represented in the highly simplified schematic illustration of FIG. 6. Four hypothetical sensors, 81–84, are shown in FIG. 6 connected to a multiplexer 90 which can be controlled by a microcontroller 50 with outputs to the multiplexer on line 92. Signals from the four sensors, 81–84, are passed through the multiplexer sequentially on line 94 to a filter network 96. The filtered signal is then provided to the microcontroller 91 on line 98. A single filter 96 can be used to filter each of the signals from the four sensors. The configuration shown in FIG. 6 differs from the alternative known approach of providing a filter network for each of the sensors, 81–84, and passing the filtered signals through the multiplexer to the microcontroller 91.

With continued reference to FIG. 6, this circuit portion of the present invention also provides precision resistors that enable the system to perform self diagnosis techniques to assure that it is operating properly. The four precision resistors are identified by reference numerals 101–104. The microcontroller 91 can provide a command on line 92 to the multiplexer 90 which causes the multiplexer to connect one of the precision resistors to the microcontroller 91. In FIG. 6, four resistors are illustrated for these purposes, but it should be clearly understood that different configurations and implementations of this concept could use a single precision resistor. In order to perform the self diagnosis, the microcontroller 91 can periodically cause the multiplexer 90 to switch to one of the precision resistors so that the microprocessor can determine the measured value of the resistor. If the measured value of the precision resistor differs significantly from the known value of the precision resistor, an alarm can be generated to alert the system operator that a malfunction has occurred. Alternatively, minor differences between the measured value of a precision resistor and its actual known value can be responded to by the application of a correction factor by the microcontroller 91 to adjust the magnitudes measured by the sensors, 81–84. For example, by monitoring the measured value of a precision resistor and comparing the measured value to the resistor's actual value, the microcontroller 91 can hypothetically determine that the system is measuring the values too low by two percent. This would result in the microcontroller 91 correcting future readings by two percent. Alternatively, the error between the measured value and the actual known value of the precision resistor could be sufficiently large to cause the microcontroller 91 to create a alarm condition and shut the system down.

Figure 7:
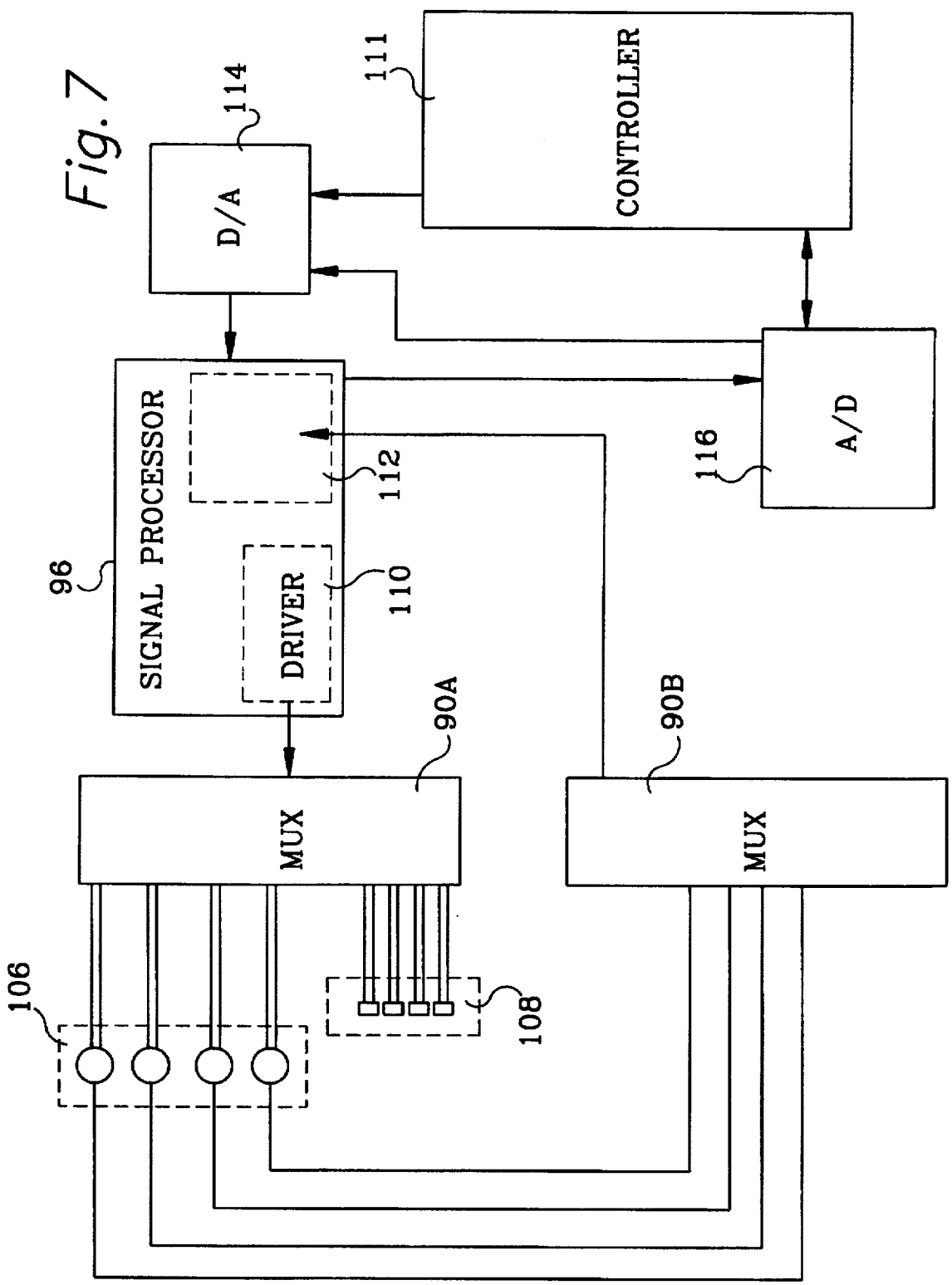
FIG. 7 is a detailed schematic illustrated the principles described in conjunction with FIG. 6.

FIG. 7 shows a more detailed illustration of a hypothetical circuit which implements the concepts described above in conjunction with FIG. 6. Two multiplexers, 90A and 90B, are shown connected to a signal processor 96. Within the signal processor 96, the filter 32 and inverter 34 of FIG. 3 are included as represented by dashed box 112. In addition, the amplifier and related components are included as represented by dashed box 112. A driver 110 is also shown. Through multiplexer 90A, these circuit portions are sequentially connected to the individual sensors which are shown in dashed box 106. These sensors represent those which are identified by reference numerals 81–84 in FIG. 6. The precision resistors identified by reference numerals 101–104 are illustrated within dashed box 108 in FIG. 7. The digital-to-analog converter 114 receives commands from the controller 111 and converts squarewave pulses to a sinusoidal waveform. Each of the sensors 106 is sequentially connected, through multiplexer 90A, to the signal processor 96. Signals received from the individual sensors are sequentially connected, through multiplexer 90B, to the filter and inverter circuit portions 112. Analog-to-digital converter 116 is connected to the controller 111, the digital-to-analog converter 114 and the filter circuit 96. The precision resistors 108 can be selectively connected to the filter circuit 96, through multiplexer 90B, as shown in FIG. 7. As illustrated in FIG. 7, one filter circuit 96 is used for all the sensors 106 and precision resistors 108. The filter circuit 96 is connected between the multiplexers, 90A and 90B, and the controller 50. Furthermore, the multiplexers, 90A and 90B, are connected between the sensors 106 and the filter circuit 96. Since one filter network 96 can be used in conjunction with a plurality of sensors 106, a significant reduction can be realized in the number of components of the system.

As described in detail in U.S. Pat. No. 5,180,978, the proximity sensor measures the AC impedance and the DC resistance and combines these two values to form a synthesized magnitude which is referred to as the compensated resistance. The compensated resistance $R_C$ can be used to determine the actual gap between a metallic object and the coil of the proximity sensor. The relationship between the compensated resistance $R_C$ and the gap is typically nonlinear and illustrated in FIG. 8. Once the compensated resistance is determined, the magnitude of the gap can be determined. In a typical application of the present invention, the values of the compensated resistance $R_C$ are compared to various threshold magnitudes to make the determination of whether or not a metallic object is within the detection zone proximate the coil of the proximity sensor. As an example, using an activation point threshold 120 and a deactivation threshold magnitude 122, as illustrated in FIG. 8, the presence or absence of a metal object in the detection zone can be determined. If the magnitude of the compensated resistance $R_C$ is greater than the activation threshold 120, the microcontroller can determine that a metallic object is in the detection zone. Similarly, if the compensated resistance $R_C$ is less than the deactivation point threshold 122, the microcontroller can determine that no metal object is in the detection zone of the proximity sensor. Between thresholds 120 and 122, an undetermined condition exits.

By using the magnitude of the compensated resistance $R_C$, the present invention can perform several other techniques of self diagnosis. For example, if it is empirically determined that the activated state of the sensor results in a magnitude of compensated resistance between lines 126 and 128 during normal operation, this zone Z1 can be used as one type of self diagnosis tool. In other words, if the magnitude of the compensated resistance $R_C$ is greater than threshold 128 or less than threshold 126 when it exceeds threshold 120, a minor abnormality might exist. In other words, the system is not as repeatable as expected. Although this condition may not warrant an alarm condition, it can be used as a self diagnosis tool that alerts the operator of a possibly impending problem. Similarly, thresholds 130 and 132 can be used to define a second zone Z2 in which the magnitude of the compensated resistance is expected to be when the system is in a deactivated condition because the magnitude of the compensated resistance is less than threshold 122. Values of $R_C$ outside zones Z1 or Z2 can also indicate a change in the normal physical relationship of a sensor and the metal object that it is expected to detect.

The present invention also permits the microcontroller to perform certain self diagnosis techniques and procedures based on the individual magnitudes of the AC impedance $R_{AC}$ and the DC resistance $R_{DC}$ individually. Prior to the combination of these two variables to determine the compensated resistance $R_C$, the two raw values of the AC impedance and DC resistance can be used in cooperation with each other to define certain types of conditions. FIG. 9 illustrates a hypothetical matrix that could be used for these purpose. The horizontal axis of the matrix represents the AC impedance as three categories, low, normal and high. The vertical axis of the matrix represents the DC resistance as low, normal and high. This forms a nine position matrix that can identify various probably conditions base on this diagnosis technique.

With reference to FIG. 9, it can be seen that if the AC impedance and the DC resistance are both low, a short circuit sensor fault might be the cause. Similarly, if the AC impedance is low, but the DC resistance is high, an open circuit might be the cause. Although a simple matrix such as that illustrated in FIG. 9 can not be expected to specifically diagnose each possible fault in detail, it has been found to be helpful in identifying likely causes of the problem which should be examined first before other possible problems are pursued. These self diagnosis tools provided by the present invention facilitate the identification of potential problems and also provide an early warning system that allows an operator to investigate and possible correct a problem prior to a catastrophic failure or automatically switch to an alternate system.

In the description above, three improvements are described with relation to a proximity sensing circuit. These improvements, which are related with one another, can be used in combination.

With reference to FIGS. 3 and 5, several circuit points are identified by letters. For example, letters C and D represent the circuit points of the first and second sources of the first and second waveforms. These first and second sources are also identified by reference numerals 22 and 24, but the letter designations are intended to specifically identify the connection points between the circuit portion shown in FIG. 3 and the circuit portion shown in FIG. 5. Furthermore, the circuit points identified by letters A and B represent two circuit points where the first and second series of pulses occur. These points in FIG. 5 identify the source of the pulses in FIG. 3 which drive the switch 44 in sequence with the pulses provided at the first and second sources, 22 and 24. The two circuit points identified by letters E and F in FIG. 3 represent the provision of the AC impedance signal and DC resistance signal to a receiving device, such as a microcontroller. Although not specifically shown connected to a microcontroller, it should be recognized that the mathematical combination of the values for the AC impedance and DC resistance are combined and analyzed by the microcontroller or microprocessor according to the techniques described in detail in U.S. Pat. No. 5,180,978. It is the microcontroller, or microprocessor, that calculates the compensated resistance value $R_C$ which is used to determine the gap between a metal object and the coil of the proximity sensor.

The values of the components shown in the Figures are identified in Table I, below.

TABLE I

| R1 | 100 K-ohms |
|---|---|
| R2 | 100 K-ohms |
| R3 | 49.9 K-ohms |
| R4 | 100 ohms |
| R5 | 100 K-ohms |
| R6 | 49.9 K-ohms |
| R7 | 49.9 K-ohms |
| R8 | 301 ohms |
| R9 | 100 ohms |
| R10 | 100 K-ohms |
| R11 | 100 K-ohms |
| R12 | 10 K-ohms |
| R13 | 5.9 K-ohms |
| R14 | 12.1 K-ohms |
| R15 | 12.1 K-ohms |
| R16 | 10 K-ohms |
| R17 | 5.9 K-ohms |
| R18 | 71.5 K-ohms |
| R19 | 71.5 K-ohms |
| R20 | 49.9 K-ohms |
| R21 | 49.9 K-ohms |
| R22 | 301 K-ohms |
| R23 | 301 K-ohms |
| C1 | 47 picofarads |
| C2 | 0.1 microfarads |
| C3 | 1 microfarad |
| C4 | .0047 microfarads |
| C5 | .0047 microfarads |
| C6 | .1 microfarads |
| C7 | .1 microfarads |

Although the present invention has been described with considerable detail and illustrated with particular specificity, it should be understood that alternative embodiments of the present invention are also within its scope.

The embodiments of the invention in which an exclusive property or right is claimed are defined as follows:

1. A proximity sensing circuit, comprising:

a proximity detector having a coil, said coil having a first end and a second end;

an amplifier having a first input, a second input and an output, said coil being connected between said first input and said output of said amplifier;

a first source of a first waveform having a first frequency;

a second source of a second waveform having a second frequency;

means for combining said first and second waveforms to provide a combined waveform, said combining means being connected to said first input of said amplifier;

a filter connected to said output of said amplifier to provide a first output signal;

an inverter connected to said filter to provide a second output signal;

first means for creating a first series of pulses, said first creating means having an output connected to an input of said first source of said first waveform;

second means for creating a second series of pulses, said second creating means having an output connected to an input of said second source of said second waveform;

first means, connected in signal communication with said first creating means, for periodically changing the frequency of said first series of pulses; and second means, connected in signal communication with said second creating means, for periodically changing the frequency of said second series of pulses.

2. The circuit of claim 1, wherein:
said first creating means is a controller.

3. The circuit of claim 1, wherein:
said second creating means is a controller.

4. The circuit of claim 1, wherein:
said first periodically changing means comprises a controller.

5. The circuit of claim 1, wherein:
said second periodically changing means comprises a controller.

6. The circuit of claim 1, wherein:
said first source comprises a digital to analog converter.

7. The circuit of claim 1, wherein:
said second source comprises a digital to analog converter.

8. The circuit of claim 1, wherein:
said frequency of said first series of pulses is higher than said frequency of said second series of pulses.

9. A proximity sensing circuit, comprising:

a proximity detector having a coil, said coil having a first end and a second end;

an amplifier having a first input, a second input and an output, said coil being connected between said first input and said output of said amplifier;

a first source of a first waveform having a first frequency;

a second source of a second waveform having a second frequency;

means for combining said first and second waveforms to provide a combined waveform, said combining means being connected to said first input of said amplifier;

a filter connected to said output of said amplifier to provide a first output signal;

an inverter connected to said filter to provide a second output signal;

first means for creating a first series of pulses, said first creating means having an output connected to an input of said first source of said first waveform;

second means for creating a second series of pulses, said second creating means having an output connected to an input of said second source of said second waveform;

first means, connected in signal communication with said first creating means, for periodically changing the frequency of said first series of pulses; and second means, connected in signal communication with said second creating means, for periodically changing the frequency of said second series of pulses, said first and second creating means being a controller.

10. The circuit of claim 9, wherein:
said first periodically changing means comprises a controller.

11. The circuit of claim 9, wherein:
said second periodically changing means comprises a controller.

12. The circuit of claim 9, wherein:
said first source comprises a digital to analog converter.

13. The circuit of claim 9, wherein:
said second source comprises a digital to analog converter.

14. The circuit of claim 9, wherein:
said frequency of said first series of pulses is higher than said frequency of said second series of pulses.

15. A proximity sensing circuit, comprising:

a proximity detector having a coil, said coil having a first end and a second end;

an amplifier having a first input, a second input and an output, said coil being connected between said first input and said output of said amplifier;

a first source of a first waveform having a first frequency;

a second source of a second waveform having a second frequency;

means for combining said first and second waveforms to provide a combined waveform, said combining means being connected to said first input of said amplifier;

a filter connected to said output of said amplifier to provide a first output signal;

an inverter connected to said filter to provide a second output signal;

first means for creating a first series of pulses, said first creating means having an output connected to an input of said first source of said first waveform;

second means for creating a second series of pulses, said second creating means having an output connected to an input of said second source of said second waveform;

first means, connected in signal communication with said first creating means, for periodically changing the frequency of said first series of pulses; and second means, connected in signal communication with said second creating means, for periodically changing the frequency of said second series of pulses, said first and second creating means being a controller, said first and second periodically changing means comprising a controller.

16. The circuit of claim 15, wherein:

said first source comprises a first digital to analog converter.

17. The circuit of claim 16, wherein:
said second source comprises a second digital to analog converter.

18. The circuit of claim 17, wherein:
said frequency of said first series of pulses is higher than said frequency of said second series of pulses.

* * * * *